(12) United States Patent
Welch et al.

(10) Patent No.: US 7,261,026 B2
(45) Date of Patent: Aug. 28, 2007

(54) ENHANCED PINMAT FOR MANUFACTURING HIGH-STRENGTH PERFORATED LAMINATE SHEETS

(75) Inventors: John M. Welch, Wichita, KS (US); Thomas D. Popp, Wichita, KS (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 10/904,012

(22) Filed: Oct. 19, 2004

(65) Prior Publication Data

US 2006/0081102 A1    Apr. 20, 2006

(51) Int. Cl.
*B26F 1/24* (2006.01)
(52) U.S. Cl. .......................................... 83/660; 30/358
(58) Field of Classification Search .................. 83/660, 83/669, 670, 673; 30/358, 366, 359, 362, 30/367, 368
See application file for complete search history.

(56) References Cited

U.S. PATENT DOCUMENTS

| | | | | |
|---|---|---|---|---|
| 3,704,194 A | * | 11/1972 | Harrier | 156/245 |
| 3,787,546 A | * | 1/1974 | Pratt et al. | 264/156 |
| 5,252,279 A | * | 10/1993 | Gore et al. | 264/154 |
| 5,617,619 A | * | 4/1997 | Knudson | 30/366 |
| 6,190,602 B1 | * | 2/2001 | Blaney et al. | 83/660 |
| 2004/0187661 A1 | * | 9/2004 | Obrachta | 83/30 |

* cited by examiner

*Primary Examiner*—Stephen Choi
(74) *Attorney, Agent, or Firm*—Ostrager Chong Flahert & Broitman P.C.

(57) ABSTRACT

A pinmat (12) for perforating a composite laminate sheet (20). The pinmat (12) includes a mat portion (22) and a series of pins (24) extending from the mat portion (22). Each pin (24) has a shank portion (30) extending from the mat portion (22) and a tip portion (32) extending from the shank portion (30). The tip portion (32) includes a base portion (34) extending from the shank portion (30), an accelerating portion (36) extending from the base portion (34), and a piercing portion (38) extending from the accelerating portion (36). The piercing portion (38) is utilized for penetrating the composite laminate sheet (20) within a substantially low range of applied pressure for forming a hole within the composite laminate sheet (20). Moreover, the accelerating portion (36) is utilized for penetrating the composite laminate sheet (20) at a substantially high speed for forcing the base portion (34) into the composite laminate sheet (20) within the substantially low range of applied pressure. The base portion (34) enlarges the hole formed by the piercing portion (38).

13 Claims, 4 Drawing Sheets

ENHANCED PINMAT FOR MANUFACTURING HIGH-STRENGTH PERFORATED LAMINATE SHEETS

TECHNICAL FIELD

The present invention relates generally to perforated composite laminate sheets, and more particularly to an enhanced pinmat having a robust construction for consistently manufacturing high-strength perforated composite laminate sheets and decreasing manufacturing costs associated therewith.

BACKGROUND OF THE INVENTION

Aircraft manufacturers are well known for producing aircraft nacelles, which are perforated acoustic panels typically utilized for surrounding the cargo, the crew, and/or the engines. These perforated acoustic panels typically are comprised of composite laminate sheets ("laminate sheets") having a series of holes molded therein. These laminate sheets typically are comprised of multiple plies of resin-impregnated carbon-fiber woven fabric. The holes typically are formed in the laminate sheet by forcing the laminate sheet onto a pinmat, which has a mat portion and a series of pins extending from the mat portion. In addition, the laminate sheets are consolidated against the mat portion of the pinmat for decreasing porosity within the laminate sheet and strengthening the laminate sheet.

It would be desirable to provide an enhanced pinmat having a substantially robust construction for strengthening the nacelles and decreasing manufacturing costs associated therewith.

SUMMARY OF THE INVENTION

One embodiment of the present invention is an enhanced pinmat for manufacturing a high-strength perforated composite laminate sheet. The enhanced pinmat includes a mat portion and a series of pins extending from the mat portion. Each pin has a shank portion extending from the mat portion and a tip portion extending from the shank portion. The tip portion includes a base portion extending from the shank portion, an accelerating portion extending from the base portion, and a piercing portion extending from the accelerating portion. The piercing portion is utilized for penetrating the composite laminate sheet within a substantially low range of applied pressure and forming a hole within the composite laminate sheet. Moreover, the accelerating portion is utilized for penetrating the composite laminate sheet at a substantially high speed for forcing the base portion into the composite laminate sheet within the substantially low range of applied pressure. The base portion enlarges the hole formed by the piercing portion. Also, in this embodiment, the mat portion is utilized for consolidating the composite laminate sheet within a substantially high pressure range.

One advantage of the invention is that an enhanced pinmat is provided that has an improved pin geometry for easily perforating and consolidating the composite laminate sheet within a substantially high pressure range while preventing damage to the pinmat.

Another advantage of the invention is that an enhanced pinmat is provided that substantially strengthens the perforated composite laminate sheets.

Yet another advantage of the present invention is that an enhanced pinmat is provided for decreasing manufacturing costs associated with producing the perforated composite laminate sheets.

Still another advantage of the present invention is that an enhanced pinmat is provided that has a substantially robust construction for resisting damage and maintaining a reliable, high level of quality in the perforated composite laminate sheets.

Yet another advantage of the present invention is that an enhanced pinmat is provided that has a substantially simple construction for minimizing manufacturing costs associated therewith.

The features, functions, and advantages can be achieved independently and in various embodiments of the present invention or may be combined in yet other embodiments.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
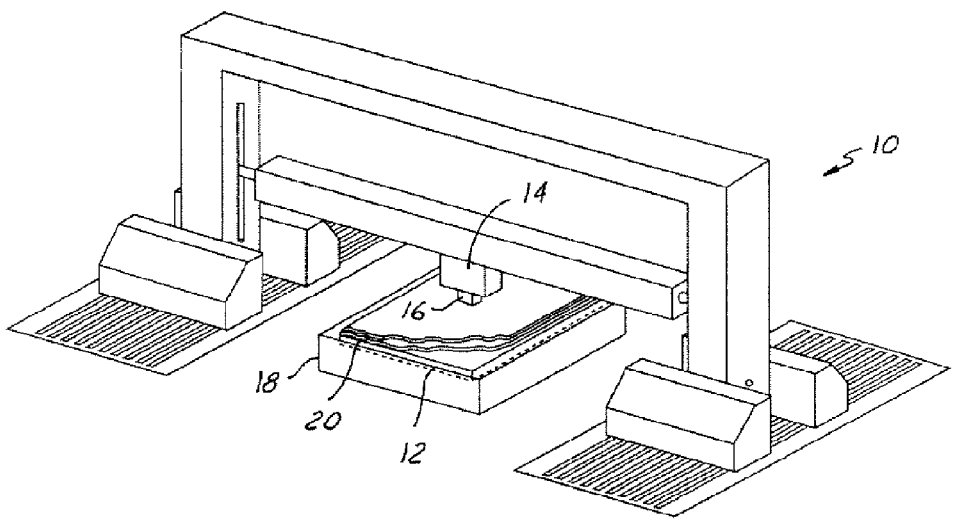
FIG. 1 is a perspective view of a high-pressure system utilizing an enhanced pinmat for producing a high-strength perforated composite laminate sheet, according to one advantageous embodiment of the claimed invention.

In the following figures, the same reference numerals are utilized for designating the same or similar components in the various views. Moreover, the illustrated embodiments described herein employ features where the context permits, e.g. when a specific result or advantage of the claimed invention is desired. In particular, the embodiments described herein utilize an enhanced pinmat for manufacturing high-strength perforated composite laminate sheets that are utilized for aircraft nacelles. However, it is contemplated that the enhanced pinmat can be utilized for manufacturing high-strength perforated sheets that are utilized in other suitable vehicles, dwellings, and environments. It is also understood that, various other embodiments are contemplated having different combinations of the described features, having features other than those described herein, or even lacking one or more of those features.

Referring to FIG. 1, there is shown a high-pressure system 10 having an enhanced pinmat 12 for producing a high-strength composite laminate sheet ("laminate sheet"). As explained hereinabove, the laminate sheet is comprised of multiple plies of resin-impregnated carbon-fiber woven fabric. However, it will be appreciated that the laminate sheet can instead be comprised of a variety of other suitable materials as desired.

Figure 2:
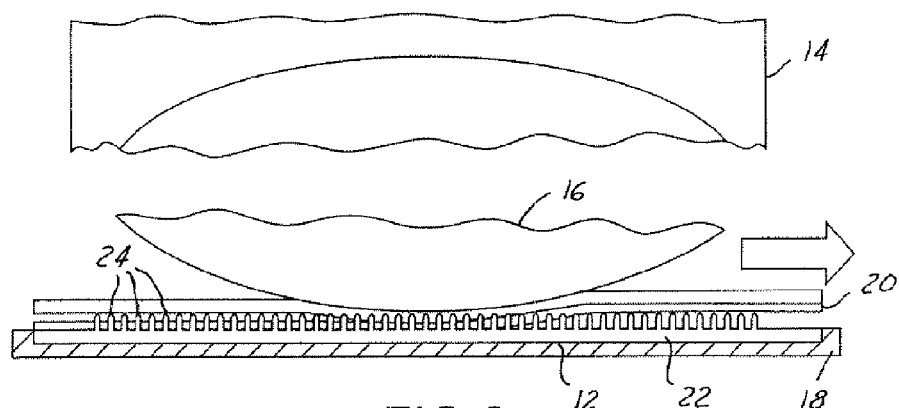
FIG. 2 is a cross-sectional view of the system shown in FIG. 1, illustrating the system utilizing a roller mechanism for forcing a composite laminate sheet onto the enhanced pinmat.

In this embodiment, the high-pressure system 10 includes a gantry 14 movable along six axes and a roller mechanism 16 mounted to the gantry 14. As best shown in FIG. 2, the high-pressure system 10 further includes a tool base 18 upon which one or more enhanced pinmats 12 are secured. A predetermined number of plies 20 of pre-impregnated carbon-fiber woven fabric are laid on top of the enhanced pinmats 12. Thereafter, the gantry 14 is operated for utilizing the roller mechanism 16 to force the plies 20 onto the enhanced pinmats 12 at a substantially high pressure, e.g. 1,100 psi. However, it is contemplated that the gantry 14 can instead apply more or less than 1,100 psi as desired. It will also be appreciated that the system 10 can utilize other suitable positive pressure sources. Examples of these positive pressure sources include an autoclave, a press machine, and a bladder device. As detailed below, the plies 20 are perforated and substantially consolidated before the plies 20 cure. It will be appreciated that substantially consolidating the plies 20 can minimize porosity therein. This feature is beneficial for manufacturing substantially strong perforated laminate sheets and minimizing the number of wasted sheets, which are excessively porous.

Figure 3A:
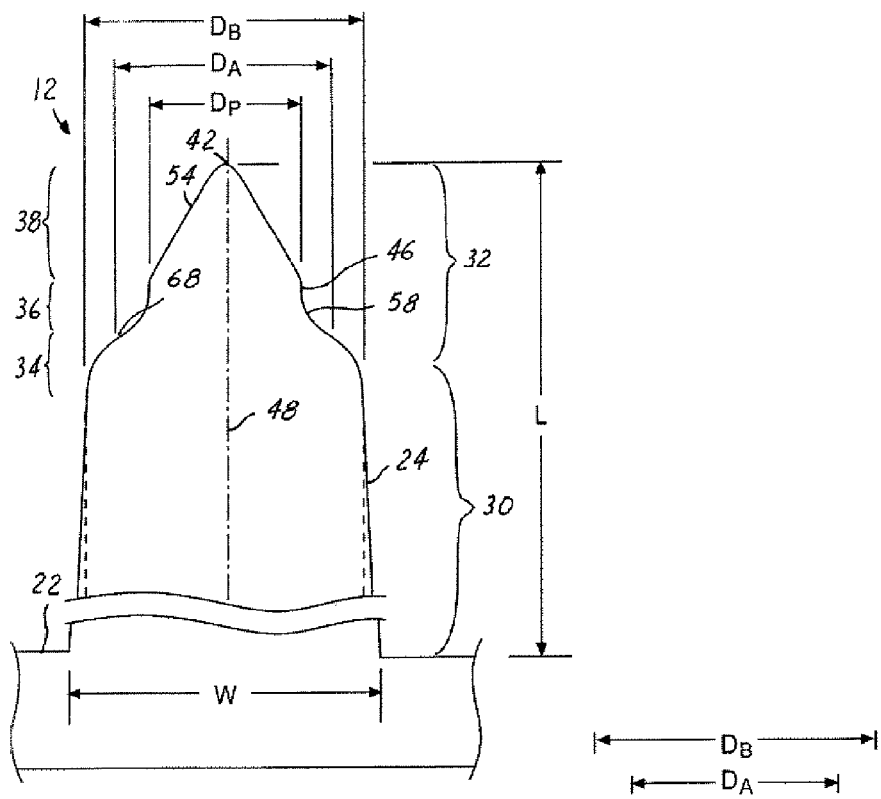
FIG. 3A is an enlarged view of a pin extending from the enhanced pinmat shown in FIGS. 1 and 2.
Figure 3B:
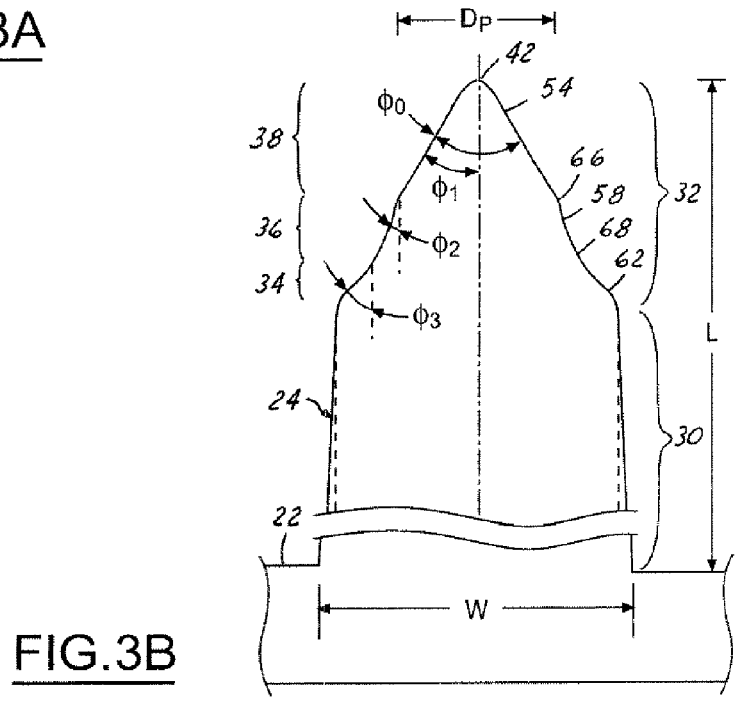
FIG. 3B is an enlarged view of the pin shown in FIG. 3A, according to another advantageous embodiment of the claimed invention.
Figure 3C:
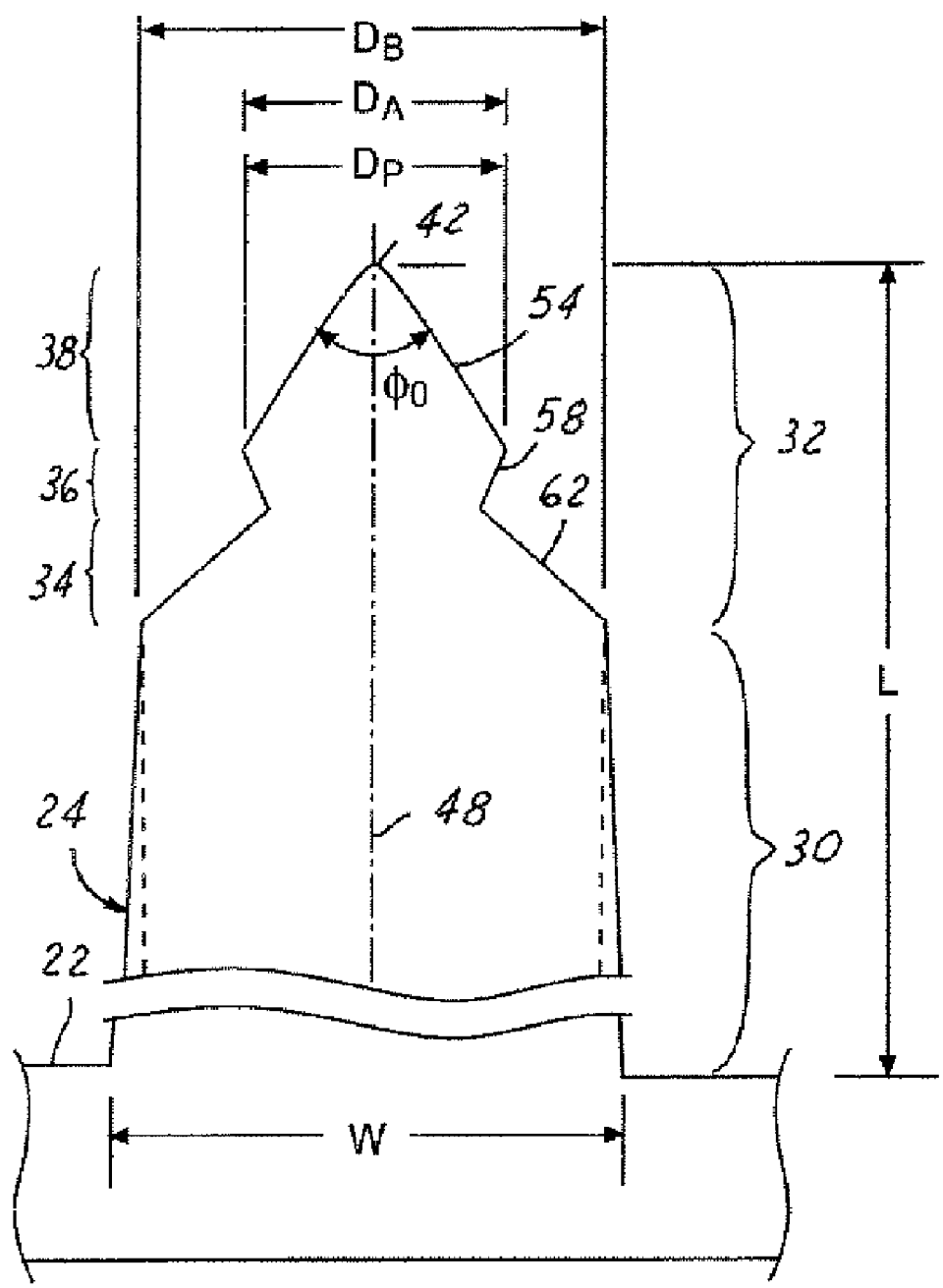
FIG. 3C is an enlarged view of the pin shown in FIG. 3A, according to yet another advantageous embodiment of the claimed invention.

As detailed in the description for FIGS. 3A-3C, the enhanced pinmat 12 has a substantially robust construction for perforating and consolidating the plies 20 so as to strengthen individual pins and distribute a substantial portion of the applied force to a mat portion 22 of the pinmat 12 instead of to the pins 24 extending from the mat portion 22. In this way, the pins 24 easily penetrate into the plies 20 and resist bending, buckling, mashing, mushrooming, or completely breaking off the mat portion 22. For that reason, the pins 24 cleanly form the holes and provide substantially improved hole quality for enhanced acoustic performance. In addition, the plies 20 are substantially consolidated against the mat portion 22 for minimizing porosity within the final perforated laminate sheet and substantially strengthening the final perforated laminate sheet.

Referring now to FIG. 3A, there is shown an enlarged view of a pin 24 extending from the mat portion 22 of the pinmat 12, which is illustrated in FIGS. 1 and 2. This pin 24 has a substantially low length-to-diameter ratio for providing a substantially strong construction that resists bending, buckling, mashing, mushrooming, or completely breaking off the mat portion 22. For instance, the length-to-diameter ratio can be 2:1 with the overall length (L) of the pin 24 being 0.090 inch and the overall maximum diameter (W) being 0.045 inch. However, other suitable lengths and diameters can be utilized to strengthen the pins.

This pin 24 generally includes a shank portion 30 extending from the mat portion 22 and a tip portion 32 extending from the shank portion 30. Furthermore, the tip portion 32 includes a base portion 34 extending from the shank portion 30, an accelerating portion 36 extending from the base portion 34, and a piercing portion 38 extending from the accelerating portion 36.

The piercing portion 38 is sized for easily penetrating into the plies 20. Specifically, it is understood that as the plies 20 are forced onto the pins 24, frictional forces exist between the surface area of the pins 24 and the plies 20. Also, the fibers within each ply 20 of fabric are displaced, bunched together, and spread around the pins 24 so as to create reactive forces within each ply 20 of fabric. In this way, the frictional forces and the reactive forces can impede the pins 24 as they penetrate into the plies 20.

For that reason, the piercing portion 38 has a substantially small surface area for substantially decreasing friction between the pins 24 and the plies 20 and easily penetrating into the plies 20. This can be accomplished by sizing the piercing portion 38 with a substantially conical construction and a substantially small maximum piercing diameter (DP), e.g. 0.0215 inches. It is contemplated the piercing portion can have various other suitable constructions, as exemplified in FIGS. 3B and 3C.

In addition, the substantially small maximum piercing diameter (DP) or thickness also causes less displacement of the fibers within the plies 20. In that way, the piercing portion 38 is sized for minimizing the reactive forces within the plies 20 of the fabric and easily penetrating into the plies 20. For this additional reason, the piercing portion 38 can easily penetrate the plies 20.

Moreover, the piercing portion 38 also has a substantially sharp tip 42 for further facilitating penetration into the plies 20. For instance, this tip 42 has a first radius of curvature of about 0.002 inches with a convex configuration. Also, the piercing portion 38 has a conical construction with a pointed angle ($\phi 0$) of about 58 degrees. However, it is contemplated that the piercing portion 38 can have a variety of other suitable radii, angles, or thicknesses as desired.

In other words, it will be appreciated that the piercing portion 38 has an overall construction for penetrating into the plies 20 within a substantially low range of pressure applied to the plies 20, e.g. 680 psi. However, it is understood that the piercing portion 38 can instead easily penetrate the plies at substantially high applied pressures, e.g. 1,100 psi, for consolidating the plies 20 against the mat portion 22 of the pinmat 12.

The accelerating portion 36 has a suitable construction for penetrating into the plies 20 at a substantially high speed for easily penetrating the base portion 34 into the plies 20. In this embodiment, the accelerating portion 36 has an annular ogive curvature with a concave configuration and a radius of curvature of about 0.015 inches. A top end portion 46 of the annular ogive curvature is substantially parallel to a longitudinal axis 48 of the shank portion 30. In this way, the applied pressure can force the accelerating portion 36 into the plies 20 at a greater speed than that by which the piercing portion 38 penetrates the plies 20.

The base portion 34 is sized for enlarging the hole that was initially formed by the piercing portion 38. As detailed hereinabove, the piercing portion 38 is sized substantially small for easily penetrating into the plies 20 and forming an initial hole. In this respect, the base portion 34 is sized larger than the piercing portion 38 for increasing the size of that initial hole. However, the base portion 34 can still penetrate the plies 20 within the substantially low range of applied pressure because the accelerating portion 36 forces the plies 20 onto the base portion 34 at the substantially high speed. It is also understood that the base portion 34 can instead penetrate the plies 20 at substantially high applied pressures for substantially consolidating the plies 20 against the mat portion 22.

In other words, the base portion 34 has a maximum base diameter (DB) that is larger than a maximum piercing diameter (DP) of the piercing portion 38. In that regard, the base portion 34 enlarges the hole initially formed by the piercing portion 38. In addition, the maximum base diameter (DB) is larger than a maximum accelerating diameter (DA) for allowing the plies 20 to be forced onto the base portion with sufficient speed to penetrate the base portion 34 into the plies 20 within the substantially low range of applied pressure.

In view of the above, it will be appreciated that the tip portion 32 generally increases in thickness toward the shank portion 30 at variable rates. Specifically, the piercing portion 38 and the base portion 34 increase in thickness toward the shank portion 30 at a greater rate than that of the accelerating portion 36. In this way, the tip portion 32 provides the plies 20 with sufficient momentum and utilizes the base portion 34 for enlarging the initial hole formed by the piercing portion 38. As exemplified in FIGS. 3A-3C, it is understood that the piercing portion 38, the accelerating portion 36, and/or the base portion can be linear, curved, have various other suitable constructions, or any combination thereof as desired.

For example, in the embodiment shown in FIG. 3B, the piercing portion 38, the accelerating portion 36, and the base portion 34 linearly increase in thickness toward the shank portion 30 at respective constant rates. In this embodiment, the piercing portion 38 has a piercing surface 54 that is offset from the longitudinal axis by a first angle ($\phi1$), e.g. 29 degrees. Moreover, the accelerating portion 36 has an accelerating surface 58 that is offset from the longitudinal axis 48 by a second angle ($\phi2$), e.g. 16 degrees, which is sufficiently smaller than the first angle for accelerating the pin 24 into the plies 20 and forcing the base portion 34 into the plies 20. Finally, the base portion 34 has a base surface 62 that is offset from the longitudinal axis 48 by a third angle ($\phi3$), 30 degrees, which is greater than the second angle ($\phi2$) for enlarging the hole initially formed by the piercing surface 54. It is contemplated that the piercing surface 54, the accelerating surface 58, the base surface 62, or any combination thereof can be offset from the longitudinal axis 48 by a variety of other suitable angles.

Also in this embodiment, the piercing portion 38 and the accelerating portion 36 have a convex rounded corner 66 therebetween for gradually accelerating the penetration of the accelerating portion 36 into the plies 20. Also, in this embodiment, the accelerating portion 36 and the base portion 34 have a concave rounded corner 68 therebetween for gradually forcing the base portion 34 into the plies 20. One skilled in the art will appreciate that the convex rounded corner 66 and the concave rounded corner 68 can provide sufficiently smooth transitions between the piercing portion 38, the accelerating portion 36, the base portion 34, and the shank portion 30 so as to prevent the plies 20 from getting caught or otherwise slowed at the transitions between those portions.

Furthermore, in the embodiment exemplified in FIG. 3C, the accelerating portion 36 decreases in thickness toward the shank portion 30. It will be appreciated that this construction can force the plies 20 onto the base portion 34 at a substantially high speed.

Referring back to FIG. 1, the system 10 further includes a heat source 70 for applying heat to the plies 20 during a cure cycle after those plies 20 have been perforated and consolidated on the pinmats 12.

Figure 4:
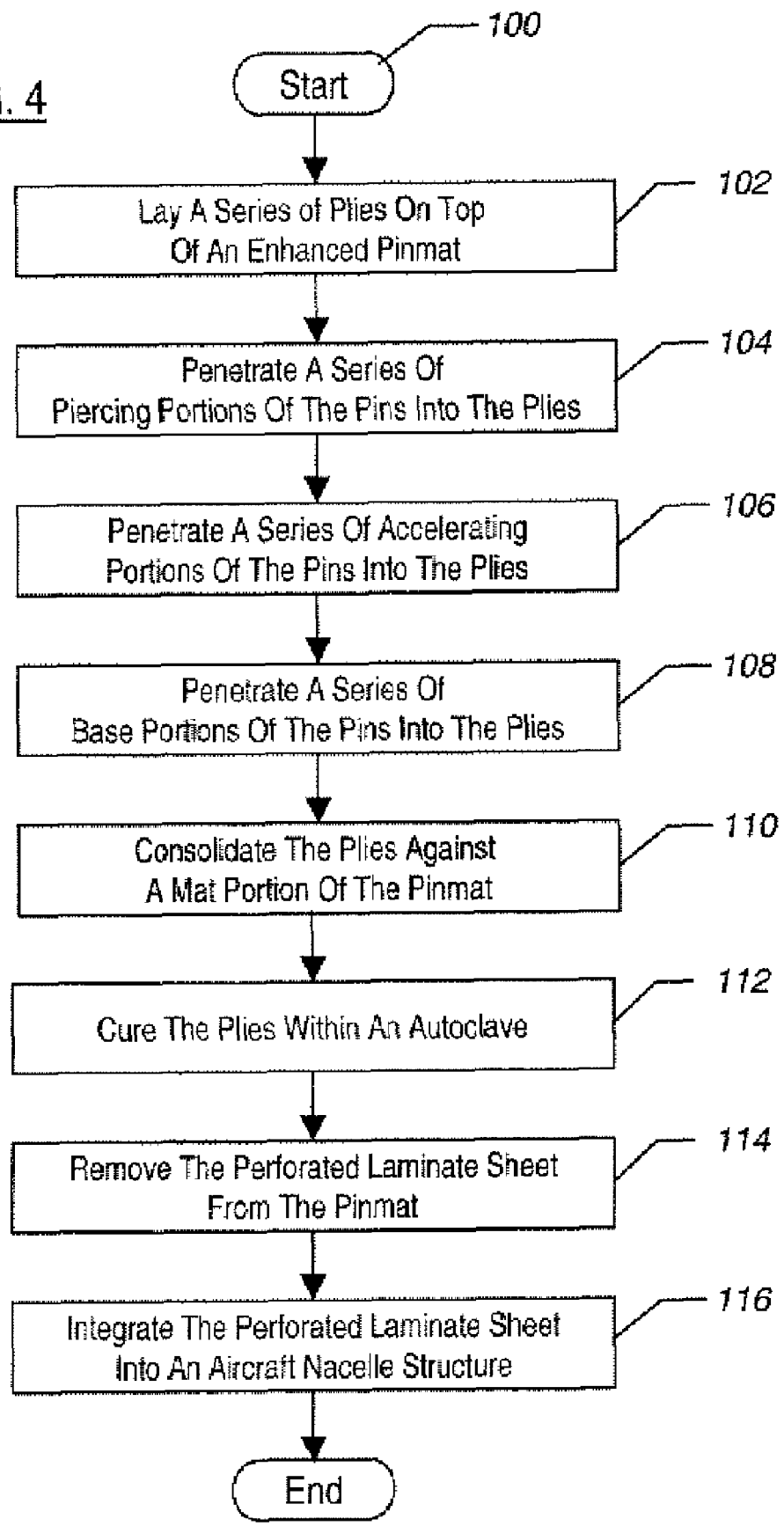
FIG. 4 is a method for utilizing the enhanced pinmat shown in FIG. 3 FOR manufacturing a high-strength nacelle for an aircraft.

Referring now to FIG. 4, there is shown a login flow diagram of a method for utilizing the enhanced pinmat 12 shown in FIGS. 1 and 2 for manufacturing an aircraft nacelle. The sequence commences in step 100 and then immediately proceeds to step 102.

In step 102, a predetermined number of plies 20 are laid upon the pins 24 of the enhanced pinmat 12 for providing a raw composite laminate sheet. These plies 20 preferably are comprised of sheets of resin-impregnated carbon-fiber woven fabric. However, it will be appreciated that the plies 20 can instead be various other suitable materials as desired. Then, the sequence proceeds to step 104.

In step 104, the plies 20 are forced onto the piercing portions 38 of the pins 24 so as to easily penetrate those piercing portions 38 into the plies 20. As detailed above, the piercing portions 38 are constructed for minimizing the frictional forces and the reactive forces that can otherwise impede penetration of the pin 24 into the plies 20. In this regard, the piercing portions 38 can penetrate the plies 20 above a substantially low applied pressure threshold. Thereafter, the sequence proceeds to step 106.

In step 106, the accelerating portions 36 of the pins 24 penetrate the plies 20 with sufficient speed for easily penetrating the base portions 34 into the plies 20. The structure of the accelerating portion 36 is exemplified above. Specifically, this step can be accomplished by penetrating an annular ogive curvature into the plies 20 with a top end portion 46 of the ogive curvature being substantially parallel to a longitudinal axis of the shank portion 30. In that way, this step can be accomplished by decreasing the frictional force between the plurality of pins 24 and the plies 20, as well as the reactive forces within each ply 20 of fabric. Then, the sequence proceeds to step 108.

In step 108, the base portions 34 easily penetrate into the plies 20 and enlarge the holes initially formed by the piercing portions 38. Specifically, the plies 20 have gained sufficient momentum as the accelerating portions 36 penetrates the plies 20 at a faster rate than that of the piercing portions 38. Then, the sequence proceeds to step 110.

In step 110, the plies 20 are consolidated against the mat portion 22 of the pinmat 12 at a substantially high applied-pressure. This feature is beneficial for minimizing porosity of the sheet thereby strengthening the sheet. Additionally, the heat source applies heat to the plies 20 for aiding in consolidation of the plies 20 and forming. Then, the sequence proceeds to step 112.

In step 112, the plies 20, which are consolidated against the mat portion 22, are cured in an autoclave, oven, or other suitable curing device within a predetermined temperature range, e.g. 270 F.-300 F. Then, the sequence proceeds to step 114.

In step 114, the cured and perforated laminate sheet (plies 20) is removed from the pinmat 12. This step can be accomplished by utilizing pins 24 having shank portions 30, which gradually increase in thickness toward the mat portion 22. In that way, there is substantially low friction between the shank portions 30 and the laminate sheet as the laminate sheet is removed from the pinmat 12. It will be understood that this feature increases the speed by which the laminate sheet is removed from the pinmat 12, decreases the risk of pin breakage, and minimizes the risk of obstructed holes. Then the sequence proceeds to step 116.

In step 116, the laminate sheet is integrated within a predetermined nacelle structure for an aircraft. However, it will be appreciated that the laminate sheet can instead be integrated within a variety of other suitable vehicles, buildings, or environments as desired.

While particular embodiments of the invention have been shown and described, numerous variations and alternate embodiments will occur to those skilled in the art. Accordingly, it is intended that the invention be limited only in terms of the appended claims.

What is claimed is:

1. A pinmat for perforating a composite laminate sheet, comprising:
   a mat portion; and
   a plurality of pins extending from said mat portion;
   wherein each pin of said plurality of pins has a shank portion extending from said mat portion and a tip portion extending from said shank portion;
   wherein said tip portion includes a base portion extending from said shank portion, an accelerating portion extending from said base portion, and a piercing portion extending from said accelerating portion;

wherein said piercing portion is utilized for penetrating the composite laminate sheet within a substantially low range of applied pressure for forming a hole within the composite laminate sheet;

wherein said accelerating portion possesses an annular ogive curvature with a concave configuration, and a top portion of the annual ogive curvature is substantially parallel to a longitudinal axis of the shank portion;

wherein said accelerating portion is utilized for penetrating the composite laminate sheet at a substantially high speed forcing said base portion into the composite laminate sheet within said substantially low range of applied pressure; said base portion being utilized to enlarge said hole formed by said piercing portion.

2. A pinmat as recited in claim 1 wherein said piercing portion generally increases in thickness toward said shank portion at a greater rate than said accelerating portion.

3. A pinmat as recited in claim 1 wherein said base portion generally increases in thickness toward said shank portion at a greater rate than said accelerating portion.

4. A pinmat as recited in claim 1 wherein at least one of said piercing portion, said accelerating portion, and said base portion linearly increases in thickness at a constant rate.

5. A pinmat for perforating a composite laminate sheet, comprising:

a mat portion; and a plurality of pins extending from said mat portion;

wherein each pin of said plurality of pins has a shank portion extending from said mat portion and a tip portion extending from said shank portion; wherein said tip portion includes a base portion extending from said shank portion, an accelerating portion extending from said base portion, and a piercing portion extending from said accelerating portion;

wherein said piercing portion penetrates the composite laminate sheet within a substantially low range of applied pressure for forming a hole within the composite laminate sheet;

wherein said accelerating portion possesses an annular ogive curvature with a concave configuration, and a top portion of the annual ogive curvature is substantially parallel to a longitudinal axis of the shank portion;

wherein said accelerating portion is utilized for penetrating the composite laminate sheet at a substantially high speed for forcing said base portion into the composite laminate sheet within said substantially low range of applied pressure;

wherein said base portion enlarges said hole;

wherein at least one of said piercing portion, said accelerating portion, and said base portion has at least one curved surface for penetrating the composite laminate sheet within said substantially low range of applied pressure.

6. A pinmat as recited in claim 5 wherein said at least one curved surface comprises:

at least one of said piercing portion having a first radius of curvature, said accelerating portion having a second radius of curvature and said base portion having a third radius of curvature.

7. A pinmat as recited in claim 5 wherein said at least one curved surface comprises:

said accelerating portion having a second radius of curvature.

8. A pinmat as recited in claim 5 wherein said at least one carved surface comprises:

said base portion having a third radius of curvature and being sized for producing said hole.

9. A pinmat as recited in claim 5 wherein said shank portion increases in thickness from said tip portion to said mat portion.

10. A pinmat for perforating a composite laminate sheet, comprising:

a mat portion; and a plurality of pins extending from said mat portion;

wherein each pin of said plurality of pins has a shank portion extending from said mat portion and a tip portion extending from said shank portion;

wherein said tip portion includes a base portion extending from said shank portion, an accelerating portion extending from said base portion, and a piercing portion extending from said accelerating portion; wherein said piercing portion penetrates the composite laminate sheet within a substantially low range of applied pressure for forming a hole within the composite laminate sheet;

wherein said accelerating portion possesses an annular ogive curvature with a concave configuration, and a top portion of the annual ogive curvature is substantially parallel to a longitudinal axis of the shank portion;

wherein said accelerating portion is utilized for penetrating the composite laminate sheet at a substantially high speed for forcing said base portion into the composite laminate sheet within said substantially low range of applied pressure;

wherein said base portion is utilized to enlarge said hole; wherein said plurality of pins has a substantially low length-to-diameter ratio for strengthening said plurality of pins.

11. A pinmat as recited in claim 10 wherein said piercing portion increases in thickness toward said shank portion at a greater rate than said accelerating portion.

12. A pinmat as recited in claim 10 wherein said base portion increases in thickness toward said shank portion at a greater rate than said accelerating portion.

13. A pinmat as recited in claim 10 wherein at least one of said piercing portion, said accelerating portion, and said base portion linearly increases in thickness at a constant rate.

* * * * *